(12) United States Patent
Valtari et al.

(10) Patent No.: US 11,056,877 B2
(45) Date of Patent: Jul. 6, 2021

(54) METHOD AND SYSTEM FOR FEEDER PROTECTION IN ELECTRICAL POWER NETWORK

(71) Applicant: ABB Schweiz AG, Baden (CH)

(72) Inventors: Jani Valtari, Tampere (FI); Ganesh Kulathu, Vadodara (IN); Sixten Holm, Vaasa (FI); Jakub Sipowicz, Cracow (PL)

(73) Assignee: ABB Schweiz AG, Baden (CH)

( * ) Notice: Subject to any disclaimer, the term of this patent is extended or adjusted under 35 U.S.C. 154(b) by 394 days.

(21) Appl. No.: 16/139,930

(22) Filed: Sep. 24, 2018

(65) Prior Publication Data

US 2019/0097410 A1   Mar. 28, 2019

(30) Foreign Application Priority Data

Sep. 22, 2017   (EP) .................................... 17192520

(51) Int. Cl.
*H02H 7/26*   (2006.01)
*H02H 3/08*   (2006.01)
(Continued)

(52) U.S. Cl.
CPC .............. *H02H 7/263* (2013.01); *G05F 1/66* (2013.01); *H02H 3/05* (2013.01); *H02H 3/08* (2013.01);
(Continued)

(58) Field of Classification Search
CPC .... H02J 13/0013; H02J 13/0079; H02J 3/001; H02H 7/26–263
See application file for complete search history.

(56) References Cited

U.S. PATENT DOCUMENTS

2004/0130837 A1\* 7/2004 Papallo ............... H02J 13/0062
361/60
2007/0135971 A1   6/2007 Andarawis et al.
2015/0318739 A1   11/2015 Oda

FOREIGN PATENT DOCUMENTS

EP   1976177 B1   7/2014
WO   2008040263 A1   4/2008
WO   2009010084 A1   1/2009

OTHER PUBLICATIONS

Translation of WO 2009/0100084. Jan. 22, 2009. (Year: 2009).\*
European Patent Office, Search Report issued in corresponding Application No. 17192520.9, complete Mar. 19, 2018, 2 pp.

\* cited by examiner

*Primary Examiner* — Jared Fureman
*Assistant Examiner* — Christopher J Clark
(74) *Attorney, Agent, or Firm* — Taft Stettinius & Hollister LLP

(57) ABSTRACT

A system and method for feeder protection in an electrical power network nodal point including at least three feeders. In the system and the method it is executed in an intelligent electronic device reserved for the feeder, on the basis of the at least one measured electrical quantity actual in the respective feeder, at least one first protection function monitoring a power system related condition of the respective feeder, as well as in a central intelligent electronic device, for at least one feeder, at least one second protection function monitoring the same power system related condition of the feeder. Furthermore the central intelligent electronic device is configured to further execute for the at least one feeder, on the basis of the at least one measured electrical quantity actual in the other feeders connected to the same nodal point, at least one third protection function monitoring the same power system related condition of the feeder.

20 Claims, 3 Drawing Sheets

(51) Int. Cl.
*H02J 13/00* (2006.01)
*G05F 1/66* (2006.01)
*H02H 7/28* (2006.01)
*H02H 3/05* (2006.01)

(52) U.S. Cl.
CPC ................ *H02H 7/26* (2013.01); *H02H 7/28* (2013.01); *H02J 13/0079* (2013.01)

METHOD AND SYSTEM FOR FEEDER PROTECTION IN ELECTRICAL POWER NETWORK

FIELD OF THE INVENTION

The present invention relates to a system for feeder protection in an electrical power network nodal point comprising at least three feeders, the system comprising at least one measurement instrument for each feeder for measuring at least one electrical quantity actual in the respective feeder, at least one intelligent electronic device for each feeder for executing, on the basis of the at least one measured electrical quantity actual in the respective feeder, at least one first protection function monitoring a power system related condition of the respective feeder, and at least one central intelligent electronic device configured to execute for at least one feeder, on the basis of the at least one measured electrical quantity actual in the respective feeder, at least one second protection function monitoring the same power system related condition of the feeder.

The present invention relates also to a method for feeder protection in an electrical power network nodal point comprising at least three feeders, the method comprising measuring in each feeder at least one electrical quantity actual in the respective feeder, executing for each feeder, on the basis of the at least one measured electrical quantity actual in the respective feeder, at least one first protection function monitoring a power system related condition of the respective feeder, and executing for at least one feeder, on the basis of the at least one measured electrical quantity actual in the respective feeder, at least one second protection function monitoring the same power system related condition of the feeder.

BACKGROUND OF THE INVENTION

Traditionally in electrical power networks and especially in a medium voltage distribution network, there exists a single intelligent electronic device, i.e. a protection and control unit, with a number of dedicated protection functions for protecting the feeder and equipment connected thereto against faults appearing in the electrical power network or equipment connected thereto. Any partial or total failure of the intelligent electronic device of the feeder, however, results in a non-availability of protection for that particular feeder, whereby that particular feeder must be disconnected from the interconnected electrical power network. In that case there is no power supply in that particular feeder, meaning that there is a power outage for all users connected to that particular feeder as long as the fault has been cleared unless the power supply can be re-routed.

EP-publication 1976177 B1 discloses a substation automation system provided with a spare intelligent electronic device for critical feeders, which spare intelligent electronic device would be taken in use in a case that the original intelligent electronic device would have a malfunction. In that case the spare intelligent electronic device is setup to provide the same functionality as the original intelligent electronic device. With the spare intelligent electronic device the outage time of the critical feeder may be reduced and the power supply can be restored as soon as the setup of the spare intelligent electronic device is finished. However, the outage of the power supply in the feeder may not be avoided, and the spare intelligent electric device and an additional wiring will increase the costs of the system.

US-publication 2007/0135971 A1 discloses another substation automation system, which in an embodiment comprises a measurement instrument for measuring an electrical quantity actual in a feeder and an intelligent electronic device reserved for the feeder for executing, on the basis of the measured electrical quantity actual in the feeder, a protection algorithm for monitoring a presence of a fault in the feeder, for example. The system further comprises, at the substation, a central intelligent electronic device, which is configured to execute for the same feeder, on the basis of the same measured electrical quantity actual in the feeder, a corresponding protection algorithm monitoring the same power system related condition of the feeder. With the system disclosed it is possible to provide a two-level protection monitoring the power system related condition of the feeder, one protection level being provided at the feeder level and another protection level being provided at the substation level. The system disclosed increases the reliability of the protection against faults appearing either in the intelligent electronic devices. The system disclosed, however, is vulnerable against malfunctions of the measurement instrument reserved for the feeder.

BRIEF DESCRIPTION OF THE INVENTION

An object of the present invention is to provide a system and a method to further improve a reliability of a feeder protection in an electrical power network.

The system according to the invention is characterized in that the central intelligent electronic device is configured to further execute for the at least one feeder, on the basis of the at least one measured electrical quantity actual in the other feeders connected to the same nodal point, at least one third protection function monitoring the same power system related condition of the feeder.

The method according to the invention is characterized by further executing for the at least one feeder, on the basis of the at least measured electrical quantity actual in the other feeders connected to the same nodal point, at least one third protection function monitoring the same power system related condition of the feeder.

In an electrical power network nodal point comprising at least three feeders the system for feeder protection comprises at least one measurement instrument for each feeder for measuring at least one electrical quantity actual in the respective feeder, i.e. at least one measurement instrument for each incoming feeder supplying power towards the nodal point and for each outgoing feeder supplying power from the nodal point. Depending on electrical power network configuration and possible distributed power generation arranged in the network, some of the feeders may be configured to operate at different times either as incoming feeders or outgoing feeders at different power network configurations.

Further the system comprises at least one intelligent electronic device for each feeder for executing, on the basis of the at least one measured electrical quantity actual in the respective feeder, at least one first protection function monitoring a power system related condition of the respective feeder, i.e. at least one intelligent electronic device for each feeder for executing, on the basis of the at least one measured electrical quantity actual in the same feeder, at least one first protection function monitoring a power system related condition of the same feeder.

Further the system comprises at least one central intelligent electronic device configured to execute for at least one specific feeder, on the basis of the at least one measured electrical quantity actual in the respective feeder, at least one second protection function monitoring the same power system related condition of the respective feeder, i.e. at least one central intelligent electronic device for executing for at least one specific selected feeder, on the basis of the at least one measured electrical quantity actual in the same specific selected feeder, at least one second protection function monitoring the same power system related condition of the same specific selected feeder.

Further, the central intelligent electronic device is configured to execute for the specific feeder, on the basis of the at least one measured electrical quantity actual in the other feeders connected to the nodal point, at least one third protection function monitoring the same power system related condition of the specific feeder, i.e. the central intelligent electronic device is configured to execute for the same specific selected feeder, on the basis of the at least one measured electrical quantity actual in each other feeder connected to the same nodal point, at least one third protection function monitoring the same power system related condition of the same specific selected feeder. Thereby the system is configured to monitor the same power system related condition of at least one feeder by at least three protection functions that work independently of each other.

The system and method disclosed provide, for at least one specific selected feeder, three redundant protection functions or protection system levels working separately and independently of each other. In other words, there is a triple redundancy for the protection of at least one feeder connected to the nodal point. This increases the reliability of the feeder protection system and decreases the vulnerability of the feeder protection system against malfunctions in the intelligent electronic device or in the measurement instrument or in a measuring circuit reserved for the specific or particular selected feeder by monitoring the same power system related condition of the feeder by at least three protection functions working independently and separately of each other. By executing for the specific feeder to be monitored, on the basis of the at least one measured electrical quantity actual in the other feeders connected to the same nodal point the third protection function monitoring the same power system related condition of the specific selected feeder as the first and second protection functions, it is possible to provide a feeder protection for the specific or particular feeder available also in an operating situation wherein no measurement information from the specific feeder to be monitored is available.

Some embodiments of the invention are disclosed in dependent claims.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DETAILED DESCRIPTION OF THE INVENTION

Figure 1:
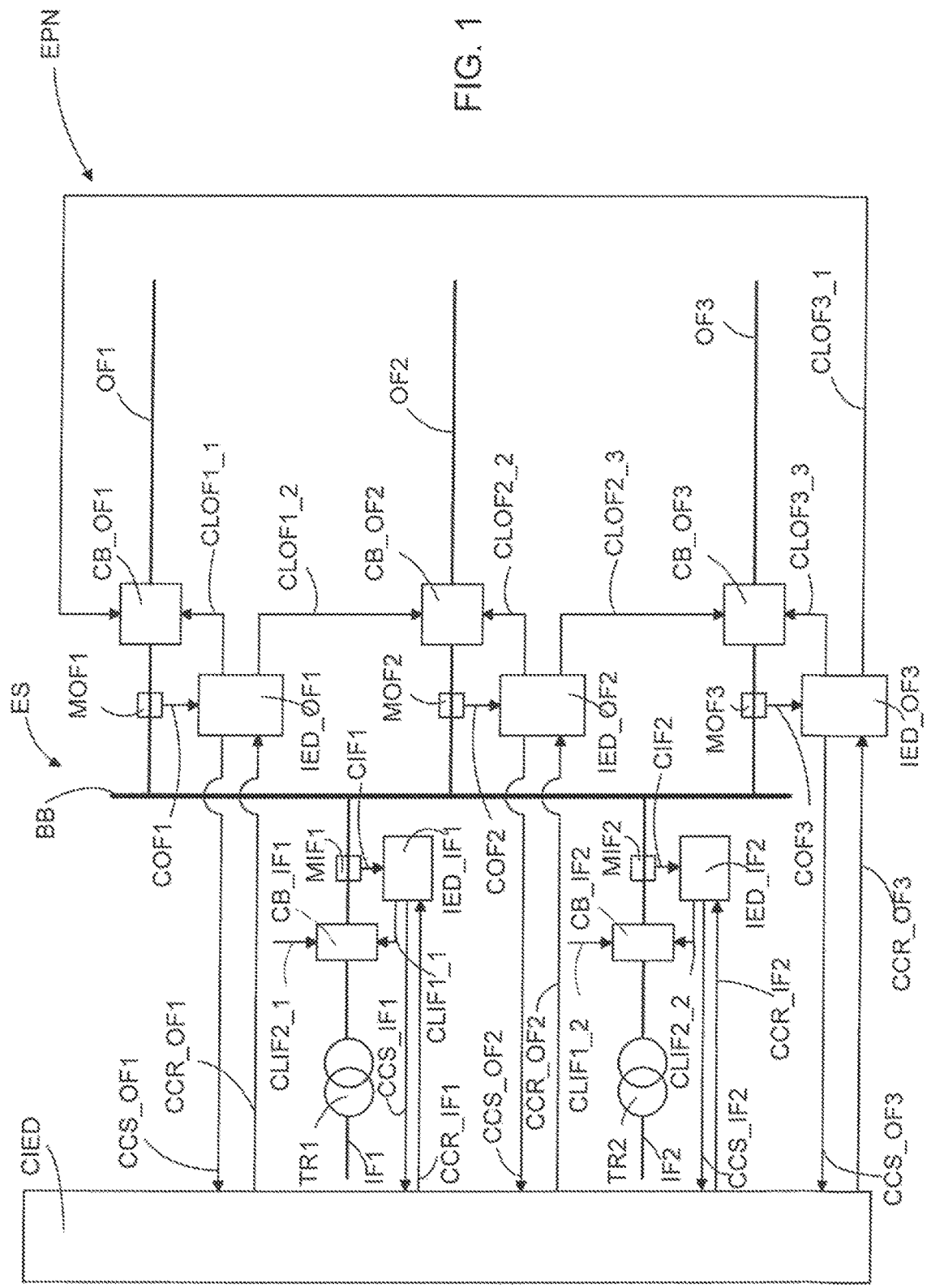
FIG. 1 is a schematic illustration of an electrical power network and a system utilized for feeder protection.

FIG. 1 is a schematic illustration of an electrical power network EPN comprising an electric station ES with two incoming feeders IF1 and IF2 supplying power to the electric station ES and three outgoing feeders OF1, OF2 and OF3 supplying power from the electric station ES, the number of the incoming feeders and the outgoing feeders being not, however, limited to that shown in FIG. 1. Depending on electrical power network configuration and possible distributed power generation arranged in the network, some of the feeders may be configured to operate at different times either as incoming feeders or outgoing feeders at different power network configurations. The electric station ES with the incoming feeders and the outgoing feeders provides one type of nodal point in an electrical power network. In its' minimum the electrical power network EPN relating to the solution presented herein should comprise altogether at least three feeders, at least one of which is an incoming feeder and at least one of which is an outgoing feeder. For the sake of clarity, in FIG. 1 only one line, i.e. a line denoted by reference sign IF1, IF2, OF1, OF2 or OF3, is used to indicate all phase lines of the respective feeder, the actual number of the phase lines being dependent on local electricity supply practices. In the following, it is assumed that the incoming feeders IF1 and IF2, which may also be called the first incoming feeder IF1 and the second incoming feeder IF2, represent high voltage transmission lines and the outgoing feeders OF1, OF2 and OF3, which may also be called the first outgoing feeder OF1, the second outgoing feeder OF2 and the third outgoing feeder OF3, represent medium voltage distribution lines, and the electric station ES represents a primary distribution substation.

The electric station ES comprises a busbar BB, to which the incoming feeders IF1 and IF2 are connected to through respective transformers TR1 and TR2, the purpose of the transformers TR1, TR2 being to transform a high voltage level used in the transmission lines into a medium voltage level used in the medium voltage distribution lines. The outgoing feeders OF1, OF2 and OF3 are also connected to the busbar BB, whereby the outgoing feeders OF1, OF2 and OF3 are connected galvanically to each other and the electric station ES provides the main power supply for loads to be connected to the outgoing feeders OF1, OF2 and OF3. The electric station ES and especially the busbar BB therein provided the nodal point for the incoming feeder IF1, IF2 and the outgoing feeders OF1, OF2, OF3 connected to the busbar BB. If the electric station ES comprises several busbars or busbar sections, each busbar or busbar sections provides a nodal point for the feeders connected to that busbar or busbar section, whereby the electric station ES may comprise multiple different nodal points.

In the electric station ES there is also a central intelligent electronic device CIED, such as a computer, like a substation computer.

In the electrical power network EPN of FIG. 1 there are further for outgoing feeders a first circuit breaker CB_OF1 at the beginning of the first outgoing feeder OF1, a second circuit breaker CB_OF2 at the beginning of the second outgoing feeder OF2 and a third circuit breaker CB_OF3 at the beginning of the third outgoing feeder OF3, as well as for incoming feeders a first circuit breaker CB_IF1 at the first incoming feeder IF1 and a second circuit breaker CB_IF2 at the second incoming feeder IF2. The circuit breakers in the incoming feeders may be arranged either at low-voltage side or high-voltage side of the respective transformer TR1, TR2.

By opening any of the circuit breakers CB_OF1, CB_OF2 and CB_OF3, CB_IF1, CB_IF2, the respective feeder may be disconnected from the busbar BB for preventing power supply to the respective feeder or for preventing power supply from the respective feeder, and by closing any of the circuit breakers CB_OF1, CB_OF2, CB_OF3, CB_IF1 and CB_IF2, the respective feeder may again be connected to the busbar BB for restoring the power supply to/from the respective feeder. Each of the circuit breakers CB_OF1, CB_OF2, CB_OF3, CB_IF1 and CB_IF2 thus provides a coupling device which in its' closed state is configured to connect the power supply to/from the respective outgoing feeder and in its' open state is configured to disconnect the power supply to/from the respective feeder. A need to disconnect any of the feeders from the busbar BB may arise because of a fault in the respective feeder or in another feeder connected to the same busbar, i.e. nodal point, whereby equipment or components both in the faulty feeder as well as in other parts of the galvanically interconnected electrical power network can be protected against harmful overvoltage or overcurrent, for example. After the fault has been cleared, the power supply may be restored by closing the respective circuit breaker.

In the electrical power network EPN of FIG. 1 there are further for outgoing feeders a first intelligent electronic device IED_OF1 reserved for the first outgoing feeder OF1, a second intelligent electronic device IED_OF2 reserved for the second outgoing feeder OF2 and a third intelligent electronic device IED_OF3 reserved for the third outgoing feeder OF3, as well as for incoming feeders a first intelligent electronic device IED_IF1 reserved for the first incoming feeder IF1 and a second intelligent electronic device IED_IF2 reserved for the second incoming feeder IF2. The intelligent electronic devices IED_OF1, IED_OF2, IED_OF3, IED_IF1, IED_IF2 are configured to monitor a power system related condition or state of the respective feeder. With the term the power system related condition of the feeder or the power system related state of the feeder it is referred especially to a situation whether or not a fault appears in the feeder and a type of the fault appearing in the feeder. Typical faults appearing in electrical power networks are short circuits and earth faults, for example. A normal power system related condition or state of the feeder is the situation wherein there is no fault appearing in the feeder. An abnormal power system condition or state of the feeder is the situation wherein there is a fault in the feeder, whereby also a fault type should be considered to provide a part of the information relating to the power system related condition or state of the feeder.

The intelligent electronic devices are configured to monitor a power system related condition or state of the respective feeders on the basis of electrical quantities of the electrical power network EPN actual in the respective feeders. Typical electrical quantities of the electrical power network EPN to be monitored are for example phase voltages U and phase currents I actual in the feeder, whereby the monitoring of the power system related condition of the feeder may have a basis on monitoring an amplitude and a phase angle of those electrical quantities, for example. The actual monitoring of the power system related condition of the feeder is based on executing, in the intelligent electronic device, one or more protection functions configured to detect or determine, on the basis of the electrical quantities actual in the feeder, whether or not a fault exists in a protected zone of the specific intelligent electronic device. Furthermore, different protection functions are used to detect different types of faults. The intelligent electronic device may comprise a microprocessor or a signal processor and possibly one or more memory units to run or execute a software program code for carrying out the sampling of the electrical quantities to be measured, for carrying out necessary computation for the determination of possible further electrical quantities of the electrical power network EPN, such as a supply frequency in the electrical power network, as well as to execute the one or more protection functions available in the respective intelligent electronic device.

The electrical quantities actual in the feeders are measured by measurement instruments MOF1, MOF2 and MOF3, i.e. the first outgoing measurement instrument MOF1 reserved for the first outgoing feeder OF1, the second outgoing measurement instrument MOF2 reserved for the second outgoing feeder OF2 and the third outgoing measurement instrument MOF3 reserved for the third outgoing feeder OF3. Each measurement instrument MOF1, MOF2, MOF3 is connected to the respective intelligent electronic device IED_OF1, IED_OF2 and IED_OF3 with respective communication channels COF1, COF2 and COF3 for transmitting the measurement information measured by the respective measurement instrument to the respective intelligent electronic device. Similar measurement instruments MIF1 and MIF2, i.e. the first incoming measurement instrument MIF1 reserved for the first incoming feeder IF1 and the second incoming measurement instrument MIF2 reserved for the second incoming feeder IF2 are available in the incoming feeders IF1, IF2. Both measurement instruments MIF1, MIF2 are connected to the respective intelligent electronic device IED_IF1, IED_IF2 with respective communication channels CIF1, CIF2 for transmitting the measurement information measured by the respective measurement instrument to the respective intelligent electronic device. In the example of FIG. 1 it is assumed, for the sake of clarity, that the measurement instruments MOF1, MOF2, MOF3, MIF1, MIF2 comprise means for measuring both current and voltage information necessary. Alternatively, the measurement instruments MOF1, MOF2, MOF3, MIF1, MIF2 may be instrument transformers for measuring only necessary current information, and necessary voltage information is provided by a suitable measurement instrument applied at the busbar BB, for example. Additional quantities such as power, may be derived for power based protection functions on the basis of the measured current and voltage information.

The intelligent electronic devices IED_OF1, IED_OF2, IED_OF3, IED_IF1 and IED_IF2 are further connected to the central intelligent electronic device CIED with respective communication channels CCS_OF1, CCS_OF2, CCS_OF3, CCS_IF1 and CCS_IF2 through which the intelligent electronic devices may send information, such as electrical quantity measurement information or different kind of status information, to the central intelligent electronic device CIED. The central intelligent electronic device CIED is also connected to the intelligent electronic devices IED_OF1, IED_OF2, IED_OF3, IED_IF1 and IED_IF2 are connected to the central intelligent electronic device CIED with communication channels CCR_OF1, CCR_OF2, CCR_OF3, CCR_IF1 and CCR_IF2 through which the intelligent electronic devices may receive information, such as control commands, from the central intelligent electronic device CIED. Additionally the measurement instruments MOF1, MOF2, MOF3, MIF1, MIF2 may send the electrical quantity measurement information directly to the central intelligent electronic device CIED through the communication channels CCR_OF1, CCR_OF2, CCR_OF3, CCR_IF1, CCR_IF2.

In the embodiment of FIG. 1 the communication channels CCS_OF1, CCS_OF2, CCS_OF3, CCS_IF1, CCS_IF2 for sending information from the intelligent electronic devices to the central intelligent electronic device and the communication channels CCR_OF1, CCR_OF2, CCR_OF3, CCR_IF1, CCR_IF2 for receiving information from the central intelligent electronic device to the intelligent electronic devices are implemented in the example of FIG. 1 as separate unidirectional communication channels for each intelligent electronic device, but they could also be united into single bidirectional communication channels for each intelligent electronic device.

Figure 2:
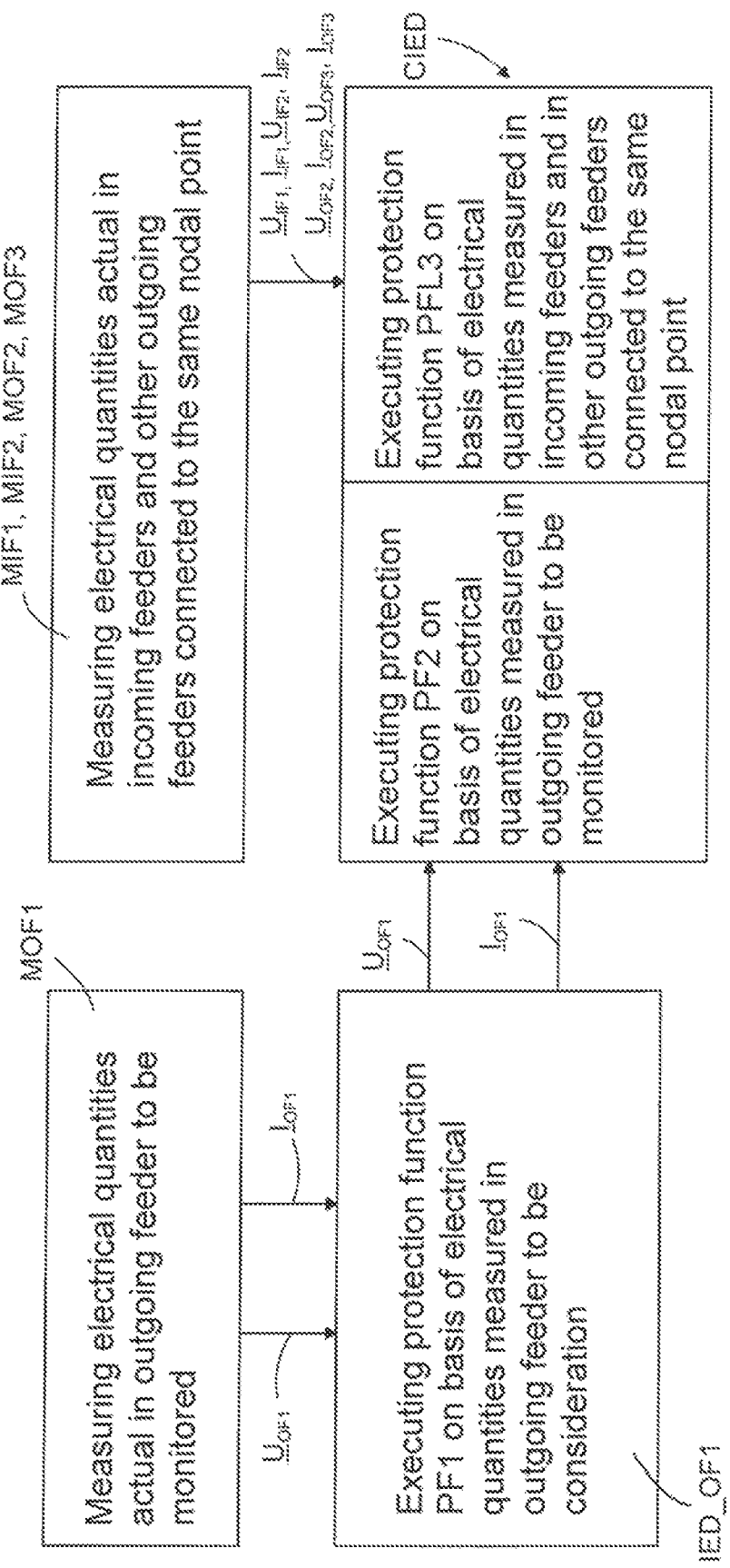
FIG. 2 is a schematic illustration of a method and a system utilized for feeder protection.

Next it is presented, referring especially to FIGS. 1 and 2, a system and a method utilized for protecting the feeders is schematically presented, FIG. 2 presenting schematically the method according to the solution. The system and method comprise altogether three redundant protection system levels for each feeder so that there is at least one protection function applied at each level to monitor the power system related condition of the feeder in order to determine whether or not a fault appears in that feeder. The protection function applied at any protection system level is executed independently and separately in respect of the protection functions at other levels. The first protection system level is realized at a feeder level and is carried out by the respective intelligent electronic device reserved for the respective feeder. The second protection system level is realized at a nodal point level and carried out by the central intelligent electronic device located at the nodal point, i.e. at the electric station ES in the example of FIG. 1. The third protection system level is also realized at the nodal point level and carried out by the central intelligent electronic device located at the nodal point.

In the following example and in FIG. 2 the solution is explained in more detail in view of the protection of the first outgoing feeder OF1 but at the same time the solution is explained also in a more general way applicable for any outgoing or incoming feeder. In the following specification reference sign PFL1 refers to one or more protection functions available in the first protection system level, reference sign PFL2 refers to one or more protection functions available in the second protection system level and reference sign PFL3 refers to one or more protection functions available in the third protection system level. The protection system may thus comprise at each protection system level one or more different protection functions monitoring different conditions of the outgoing feeders individually, like a protection function against short circuits and a protection function against earth faults. Other protection functions, such as power based protection functions, against other type of faults are naturally also possible.

As said above, the first protection system level is realized at the feeder level and it comprises measuring of the electrical quantities, such as phase busbar voltages $\underline{U}$ at every feeder or the busbar section level and phase currents $\underline{I}$ actual in every feeder continuously by the respective measurement instrument. Referring to the first outgoing feeder OF1, the phase voltages $\underline{U}_{OF1}$ and the phase currents $\underline{I}_{OF1}$ actual in the first outgoing feeder OF1 are measured by the measurement instrument MOF1. Underlinings in the reference signs of voltage and current presented above denote that the measurements are provided in a vector format or as complex numbers, whereby amplitude and phase angle information of the voltage and current signals are preserved.

The measurement information provided by the measurement instrument is transferred from the measurement instrument to the respective intelligent electronic device reserved for the specific feeder through a respective communication channel, i.e. through a communication channel COF1 from the measurement instrument MOF1 to the intelligent electronic device IED_OF1. In the intelligent electronic device the measurement information is sampled with a sampler by using a predetermined sampling frequency unless the measurement instrument itself comprises a sampler. The sampling provides unending sequences of discrete values of the electrical quantities to be measured as long as the measurement is continued, the sequences of the electrical quantity values being then used in the execution of one or more protection functions PFL1 at the first protection system level.

The protection functions PFL1 in a specific or particular intelligent electronic device are executed, on the basis of the measurements of the electrical quantities, separately and independently of corresponding protection functions stored and executed in the other intelligent electronic devices reserved for the other feeders. Generally the protection functions PFL1 at this first protection system level carries out an operation which may be referred to with a formula $$PFL1_j = f(\underline{U}_j, \underline{I}_j) \tag{1a},$$

wherein $\underline{U}_j$ refers to voltage(s) of one or more phases actual in a specific feeder and/or the busbar, $\underline{I}_j$ refers to current(s) of the same phase(s) actual in the same specific feeder, and index j refers to an identifying mark of the specific feeder under consideration and in the example of FIG. 1 it may have a mark OF1, OF2, OF3, IF1, IF2. Concerning on the first outgoing feeder OF1, the formula (1a) will have the form $$PFL1_{OF1} = f(\underline{U}_{OF1}, \underline{I}_{OF1}) \tag{1b}.$$

As mentioned shortly above, the second protection system level is realized at the nodal point level, i.e. in the example of FIG. 1 in the central intelligent electronic device CIED at the electric station ES. The central intelligent electronic device CIED comprises for each feeder a number of protection functions PFL2, at least one or some of which are intended exactly to the corresponding purpose as the protection functions PFL1 at the first protection system level, and preferably have exactly the same implementation as the corresponding protection functions PFL1. The protection functions PFL2 in the second protection system level are executed separately and independently of the protection functions PFL1 at the first protection system level but the measurements of the electrical quantities used in the execution of the protection functions at both protection system levels, i.e. in the protection functions PFL1, PFL2 are the same. Preferably the intelligent electronic device of the respective feeder forwards the measured electrical quantities to the central intelligent electronic device, whereby no extra wiring between the measurement instruments and the central intelligent electronic device is needed. Generally the protection functions PFL2 at this second protection system level carry out an operation which may be referred to with a formula $$PFL2_j = f(\underline{U}_j, \underline{I}_j) \tag{2a},$$

wherein $\underline{U}_j$ refers to voltage(s) of one or more phases actual in the specific feeder and/or the busbar, $\underline{I}_j$ refers to current(s) of the same phase(s) actual in the same specific feeder, and index j refers to an identifying mark of the specific feeder under consideration and in the example of FIG. 1 it may have a mark OF1, OF2, OF3, IF1, IF2. Concerning on the first outgoing feeder OF1, the formula (2a) will have the form $$PFL2_{OF1} = f(\underline{U}_{OF1}, \underline{I}_{OF1}) \tag{2b}.$$

The second protection system level realized at the nodal point level provides a redundant protection or redundant protection functions in respect of the protection or protection functions at the first protection system level implemented at the feeder level. This provides a more secure protection against faults appearing in the feeder in operating situations, wherein the intelligent electronic device reserved for the feeder malfunctions so that it is not able to execute the protection functions in a reliable manner. The malfunction of a particular intelligent electronic device may be detected at the central intelligent electronic device for example as a change of the status of the particular intelligent electronic device, which may be obtained either automatically by a self-checking operation carried out by the intelligent electronic device itself or as a response to a re-quest of the status initiated by the central intelligent electronic device. The malfunction of the particular intelligent electronic device may also be detected so that the specific intelligent electronic device does not communicate at all with the central intelligent electronic device.

As also mentioned shortly above, the third protection system level is realized at the nodal point level, i.e. in the example of FIG. 1 in the central intelligent electronic device CIED at the electric station ES. The central intelligent electronic device CIED comprises for each outgoing feeder a number of protection functions PFL3, at least one or some of which are also intended exactly to the corresponding purpose as the corresponding protection functions PFL1, PFL2 at the first and second protection system levels.

The implementation of the protection functions PFL3 at the third protection system level, however, differ from the implementation of the protection functions PFL1, PFL2 at the first and second protection system levels at least in respect of the measurements of the electrical quantities to be used in the execution of the protection functions PFL3. In the execution of the protection functions PFL3 available at the third protection system level it is not utilized measurements of electrical quantities of that feeder the power system related condition of which is to be monitored but it is utilized measurements of electrical quantities of other feeders that are connected to the same nodal point and that are active, i.e. the power supply being connected to them. In other words, in the execution of the protection functions PFL3 at this third protection system level the measurement information acquired from the other feeders connected to the same nodal point, including both all the incoming feeders and all the outgoing feeders except the feeder the power system related condition of which is to be monitored. This means that the electrical quantities actual in the feeder to be monitored are determined on the basis of the electrical quantities actual in all other feeders connected to the same nodal point. Referring to the example of FIGS. 1 and 2, this means that the electrical quantities actual in the first outgoing feeder OF1 are determined on the basis of the electrical quantities actual in the first IF1 and the second IF2 incoming feeders and in the second OF2 and the third OF3 outgoing feeders.

Generally the protection functions PFL3 at this third protection system level carry out for an outgoing feeder OFj an operation which may be referred to with a formula $$PFL3_{OFj}=f((\underline{U}_{IF1},\ldots,\underline{U}_{IFn}),(\underline{I}_{IF1},\ldots,\underline{I}_{IFn}),(\underline{U}_{OF1},\ldots,\underline{U}_{OFm},\notin \underline{U}_{OFj}),(\underline{I}_{OF1},\ldots,\underline{I}_{OFm},\notin \underline{I}_{OFj})) \quad (3a),$$

wherein $((\underline{U}_{IF1},\ldots,\underline{U}_{IFn})$ refers to voltage(s) of one or more phases actual in the number of n incoming feeders (n=2 in the example of FIG. 1) connected to the common nodal point, $(\underline{I}_{IF1},\ldots,\underline{I}_{IFn})$ refers to current(s) of one or more phases actual in the number of n incoming feeders connected to the common nodal point, $(\underline{U}_{OF1},\ldots,\underline{U}_{OFm},\notin \underline{U}_{OFj})$ refers to voltage(s) of one or more phases actual in the number of m outgoing feeders (m=3 in the example of FIG. 1) connected to the common nodal point but not including the voltage(s) of one or more phases actual in the outgoing feeder under consideration (having the identifying mark OFj), and $(\underline{I}_{OF1},\ldots,\underline{I}_{OFm},\notin \underline{U}_{OFj})$ refers to current(s) of one or more phases actual in the number of m outgoing feeders connected to the common nodal point but not including the current(s) of one or more phases actual in the outgoing feeder under consideration (having the identifying mark OFj). The index OFj refers to an identifying mark of the outgoing feeder to be monitored and in the example of FIG. 1 it may have a value OF1, OF2 or OF3 and the index OFj refers to an identifying mark of the incoming feeder to be monitored and in the example of FIG. 1 it may have a value IF1 or OF2.

Generally, for an incoming feeder IFj, the protection functions PFL3 at this third protection system level carry out an operation which may be referred to with a formula $$PFL3_{IFj}=f((\underline{U}_{IF1},\ldots,\underline{U}_{IFn},\notin \underline{U}_{IFj}),(\underline{I}_{IF1},\ldots,\underline{I}_{IFn},\notin \underline{I}_{IFj}),(\underline{U}_{OF1},\ldots,\underline{U}_{OFm}),(\underline{I}_{OF1},\ldots,\underline{I}_{OFm})) \quad (3b),$$

wherein $((\underline{U}_{IF1},\ldots,\underline{U}_{IFn},\notin \underline{U}_{IFj})$ refers to voltage(s) of one or more phases actual in the number of n incoming feeders (n=2 in the example of FIG. 1) connected to the common nodal point but not including the voltage(s) of one or more phases actual in the incoming feeder under consideration (having the identifying mark IFj), $(\underline{I}_{IF1},\ldots,\underline{I}_{IFn},\notin \underline{I}_{IFj})$ refers to current(s) of one or more phases actual in the number of n incoming feeders connected to the common nodal point but not including the current(s) of one or more phases actual in the incoming feeder under consideration (having the identifying mark IFj), $(\underline{U}_{OF1},\ldots,\underline{U}_{OFm})$ refers to voltage(s) of one or more phases actual in the number of m outgoing feeders (m=3 in the example of FIG. 1) connected to the common nodal point, and $(\underline{I}_{OF1},\ldots,\underline{I}_{OFm})$ refers to current(s) of one or more phases actual in the number of m outgoing feeders connected to the common nodal point.

Concerning on the first outgoing feeder OF1, the formula (3a) will have the form $$PFL3_{OF1}=f((\underline{U}_{IF1},\underline{U}_{IF2}),(\underline{I}_{IF1},\underline{I}_{IF2}),(\underline{U}_{OF2},\underline{U}_{OF3}),(\underline{I}_{OF2},\underline{I}_{OF3},)) \quad (3c).$$

The voltages and currents actual in one or more phases in the first outgoing feeder OF1 are thus determined on the basis of the measurements of voltages and currents actual in the first IF1 and second IF2 incoming feeders and in the second OF2 and third OF3 outgoing feeders.

The method for determining the electrical quantities actual in the feeder to be monitored on the basis of the electrical quantities actual in all the other feeders connected to the same nodal point may vary depending on the operating situation of the electrical power network and of a type of fault possibly appearing in the electrical power network at that particular time. For current based protection functions the measurement of voltage is not necessary. For voltage or power based protection function the measurement of voltage is also necessary. The voltage(s) to be utilized may thereby be measured by a feeder specific voltage measurement instrument if available, or by a voltage measurement instrument applied to measure the voltage(s) at the busbar BB.

According to an embodiment, the voltages actual in one or more phases in the feeder to be monitored may be the same as voltages actual in one or more phases in another feeder, whereby when referring to the example of FIGS. 1 and 2, the voltage in the first outgoing feeder OF1 may for example satisfy the formula $$\underline{U}_{OF1} = \underline{U}_{OF2} \quad (4),$$

which typically is the same as the busbar voltage in the busbar or busbar section where the feeder is connected to.

The currents actual in one or more phases in the feeder to be monitored may be determined on the basis of the currents actual in one or more phases in the other feeders connected to the same nodal point.

According to an embodiment, the currents actual in one or more phases in the feeder to be monitored may for example be determined by applying Kirchhoff's first law, according to which the sum of currents flowing into a common nodal point is equal to the sum of currents flowing out of that nodal point. This means that the current actual in the feeder to be monitored may be determined by subtracting a sum of the currents actual in outgoing feeder(s) from a sum of the currents actual in incoming feeder(s) but not taking into account the current in the feeder to be monitored. When referring to the example of FIGS. 1 and 2, the current in the first outgoing feeder OF1 satisfies the formula $$\underline{I}_{OF1} = (\underline{I}_{IF1} + \underline{I}_{IF2}) - (\underline{I}_{OF2} + \underline{I}_{OF3}) \quad (5).$$

The same principle and formula is also applicable if considering powers flowing through the feeders.

Despite of the different determination of the electrical quantities to be utilized in the protection functions PFL3 at the third protection system level, the implementation of the protection functions PFL3 at the third protection system level may be exactly the same as the implementation of the protection functions PFL1 and PFL2 at the first and second protection system levels.

The third protection system level realized at the nodal point level provides a further redundant protection system for the first protection system level realized at the feeder level and for the second protection system level realized at the nodal point level, whereby the system is configured to monitor the same condition of each single feeder by at least three redundant protection functions that work independently and separately of each other.

All the protection functions PF1, PF2, PF3 at all protection system levels are executed all the time continuously, based on new samples of measurements of electrical quantities made available at a fast sampling rate, such as 80 samples per second. Due to a need to transmit the measurement information from the intelligent electronic devices to the central intelligent electronic device, there is a small delay between the execution of the protection functions PFL1 at the first protection system level and the execution of the protection functions PFL2, PFL3 at the second and third protection system levels. This delay, however, is very minor when information is transmitted as determined in standards determined for transmission of information in electrical power networks, and it does not have any practical effect when concerning required operating times of the feeder protection. Due to a high computing power at the central intelligent electronic device the effects of the delays may also be eliminated.

The third protection system level further increases the reliability of the feeder protection system in the sense that the protection of any specific feeder may be carried out by one or more protection functions PFL3 operating at the third protection system level. This is very advantageous in operating situations wherein no measurement information from the feeder to be monitored is available or the measurement information received from the specific or particular feeder is not reliable. The advantage of this is that the power supply to this feeder may still be continued, i.e. there is no immediate need to prevent the power supply to this feeder only because of the lack of measurement information from that particular feeder. The advantage of the solution is also that it may be realized without installation of any new intelligent electronic devices to the system and without providing any new wiring between different devices.

A reason for a lack of measurement information from any of the feeder may be a malfunction in the intelligent electronic device so that the intelligent electronic device is not able to receive the measurement information from the respective measurement instrument or that the intelligent electronic device is not able to set the measurement information available for the protection functions running in the same intelligent electronic device or to transmit the measurement information further to the protection functions running in the central intelligent electronic device. The malfunction of a particular intelligent electronic device may be detected as described above.

A reason for a lack of measurement information from any of the feeder may be a malfunction in a particular measurement instrument or in a respective measuring circuit, which may be detected in a similar way as the malfunction of a particular intelligent electronic device.

A reason for the measurement information not being reliable may be a malfunction in the operation of the measurement instrument or an error in a calibration of the measurement instrument. This may be detected for example based on that the measured values of the electrical quantities are out of any reasonable limits.

The malfunction of the intelligent electronic device or the measurement instrument or the measuring circuit may also be detected as simply as not receiving any measurement information by the central intelligent electronic device.

In the specification disclosed above it is supposed that the protection system comprising all three protection system levels is provided for every feeder. It is also possible to have an embodiment that only one or some of the feeders, for example only the most critical outgoing feeder(s) in the sense of the power supply need, is/are provided with the protection system having all three protection system levels.

Furthermore, in the example above the electric station ES is provided with two incoming feeders, but it is also possible that there is only one incoming feeder or more than two incoming feeders connected to the electric station ES at a time. In its simplest form the electric station ES may comprise only one incoming feeder or only one outgoing feeder.

If any of the first protections functions PFL1 at the first protection level and executed in an intelligent electronic device reserved for the particular feeder, detects a fault appearing in that feeder, the intelligent electronic device reserved for that feeder may provide a control signal to open a respective circuit breaker for interrupting the power supply to the respective feeder. In the first outgoing feeder OF1 the control signal to open the first circuit breaker CB_OF1 is transmitted from the first intelligent electronic device IED_OF1 to the first circuit breaker CB_OF1 through a control line CLOF1_1, and respectively in the second outgoing feeder OF2 from the second intelligent electronic device IED_OF2 to the second circuit breaker CB_OF2 through a control line CLOF2_2 and in the third outgoing feeder OF3 from the third intelligent electronic device IED_OF3 to the third circuit breaker CB_OF3 through a control line CLOF3_3. Similarly in the incoming feeders the control signal to open the first circuit breaker CB_IF1 in the first incoming feeder IF1 is transmitted from the first intelligent electronic device IED_IF1 to the first circuit breaker CB_IF1 through a control line CLIF1_1 and respectively in the second incoming feeder IF2 from the second intelligent electronic device IED_IF2 to the second circuit breaker CB_IF2 through a control line CLIF2_2.

If any of the second protections functions PFL2 at the second protection level or any of the third protections functions PFL3 at the third protection level and executed in the central intelligent electronic device CIED detects a fault appearing in any of the feeders, the central intelligent electronic device may provide a control signal to open the circuit breaker in the respective feeder for interrupting the power supply to the respective feeder. The central intelligent electronic device CIED sends the control signal to open the circuit breaker through a respective communication channel CCR_OF1, CCR_OF2, CCR_OF3, CCR_IF1, CCR_IF2 to the respective intelligent electronic device IED_OF1, IED_OF2, IED_OF3, IED_IF1, IED_IF2, which forwards the control signal to the respective circuit breaker CB_OF1, CB_OF2, CB_OF3, CB_IF1, CB_IF2.

The protection functions PFL1, PFL2, PFL3 at different protection system levels may be provided with a different priority order to provide the control signal to open the circuit breaker in a particular feeder. According to an embodiment, if any of the first protection functions PFL1 at the first protection level detects a fault appearing in that particular feeder, the first protection function PFL1 at the first protection level is allowed to provide the control signal to open the respective circuit breaker in the respective feeder irrespective of the outcomes of the executions of the second protection functions PFL2 and third protection functions PFL3 at the second and third protection system levels. According to another embodiment, if any of the first protection functions PFL1 at the first protection level for a particular feeder detects a fault appearing in that particular feeder, the first protection function PFL1 is allowed to provide the control signal to open the circuit breaker in the respective feeder if at least one of the second protection function PFL2 and the third protection function PFL3 also detects a fault appearing in that respective feeder. However, if there is no measurement of electrical quantities available for a particular feeder, the control of the respective circuit breaker in that particular feeder may be carried out only on the basis of the operation of at least one third protection function PFL3 executed at the third protection system level.

The embodiment of FIG. 1 further discloses additional control lines from the intelligent electronic devices IED_OF1, IED_OF2, IED_OF3 to the circuit breakers CB_OF1, CB_OF2, CB_OF3, i.e. a control line CLOF1_2 from the first intelligent electronic device IED_OF1 in the first outgoing feeder OF1 to the second circuit breaker CB_OF2 in the second outgoing feeder OF2, a control line CLOF2_3 from the second intelligent electronic device IED_OF2 in the second outgoing feeder OF2 to the third circuit breaker CB_OF3 in the third outgoing feeder OF3, and a control line CLOF3_1 from the third intelligent electronic device IED_OF3 in the third outgoing feeder OF3 to the first circuit breaker CB_OF1 in the first outgoing feeder OF1. Similarly, there are on the incoming feeders side additional control lines from the intelligent electronic devices IED_IF1, IED_IF2 to the circuit breakers CB_IF1, CB_IF2, i.e. a control line CLIF1_2 from the first intelligent electronic device IED_IF1 in the first incoming feeder IF1 to the second circuit breaker CB_IF2 in the second incoming feeder IF2 (for the sake of clarity shown in FIG. 1 only with an arrow at the second circuit breaker CB_IF2 in the second incoming feeder IF2) and a control line CLIF2_1 from the second intelligent electronic device IED_IF2 in the second outgoing feeder OF2 to the first circuit breaker CB_IF1 in the first incoming feeder IF1 (for the sake of clarity shown in FIG. 1 only with an arrow at the first circuit breaker CB_IF1 in the first incoming feeder IF2. In this embodiment there is thus provided for each coupling device two redundant control lines for control signals configured to operate the state of the coupling device, one control line from the intelligent electronic device reserved for the same outgoing feeder and another control line from another intelligent electronic device reserved for another outgoing feeder. By this arrangement it is possible to send a control signal from the central intelligent electronic device to open a circuit breaker in a faulty feeder through an intelligent electronic device reserved for another feeder in an operating situation wherein the intelligent electronic device in the faulty feeder is unable to control the operation of the respective circuit breaker.

According to an embodiment of the system and method, the central intelligent electronic device CIED is configured to execute for at least one outgoing feeder OF1, OF2, OF3 supplying power from the nodal point and for at least one incoming feeder IF1, IF2 supplying power to the nodal point, on the basis of the at least one measured electrical quantity U, I actual in the respective outgoing OF1, OF2, OF3 and incoming IF1, IF2 feeder, at least one second protection function PFL2 monitoring the power system related condition of the respective outgoing OF1, OF2, OF3 and incoming IF1, IF2 feeder, and that the central intelligent electronic device CIED is further configured to execute for the at least one outgoing feeder OF1, OF2, OF3 and for the at least one incoming IF1, IF2 feeder, on the basis of the at least one measured electrical quantity U, I actual in the other feeders OF1, OF2, OF3, IF1, IF2 connected to the same nodal point, at least one third protection function PFL3 monitoring the condition of the respective feeder OF1, OF2, OF3, IF1, IF2. This further improves reliability and resilience towards failures in the hardware units in the system.

Figure 3:
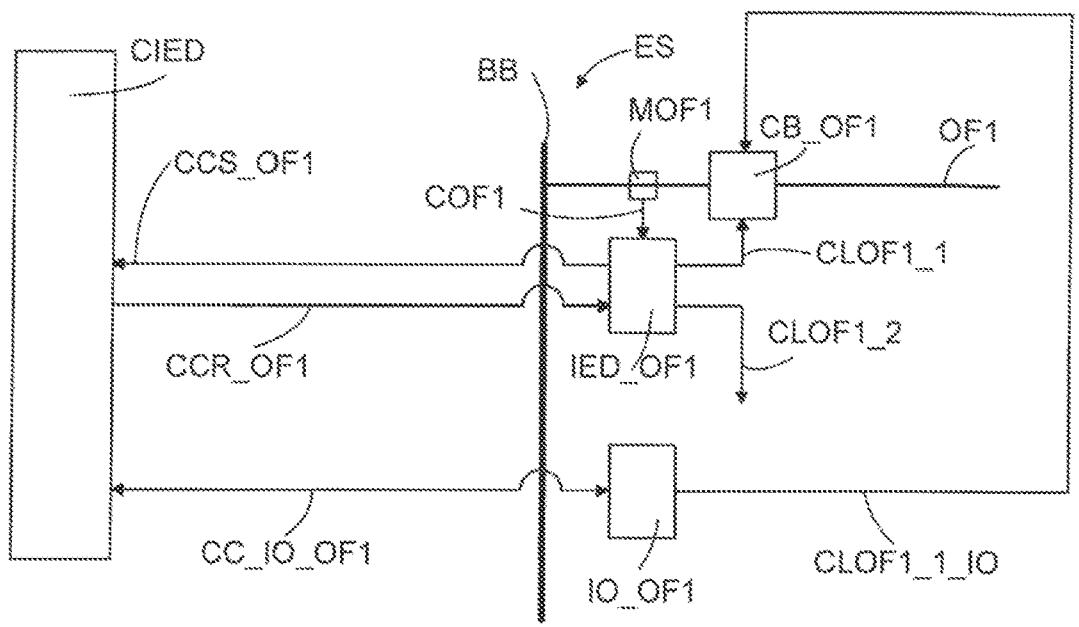
FIG. 3 presents schematically an alternative arrangement for controlling a state of a coupling device.

FIG. 3 presents schematically an alternative embodiment for controlling a state of a coupling device, i.e. a circuit breaker, in a feeder. In FIG. 3 and the related description the embodiment is considered in view of the first outgoing feeder OF1 and the circuit breaker CB_OF1 therein, but the same embodiment is applicable with any feeders and the circuit breakers therein.

In FIG. 3 three is an input-output-unit IO_OF1 reserved for the first outgoing feeder OF1 and connected to the central intelligent electronic device CIED through a bidirectional communication channel CC_IO_OF1. Furthermore the input-output-unit IO_OF1 is connected to the circuit breaker CB_OF1 through a control line CLOF1_1_IO, whereby the central intelligent electronic device CIED may provide a control signal to operate the state of the circuit breaker CB_OF1 also through the input-output-unit IO_OF1. The input-output-unit thus provides a redundant channel to operate the circuit breaker if the respective intelligent electronic device, herein the intelligent electronic device IED_OF1, is out of use. The control signal from the central intelligent electronic device CIED to operate the state of the circuit breaker may also be transmitted at the same time through the intelligent electronic device and the input-output-unit in the respective feeder.

According to an embodiment the input-output-unit at one feeder may also be connected through a respective control line to a circuit breaker at another feeder.

Figure 4:
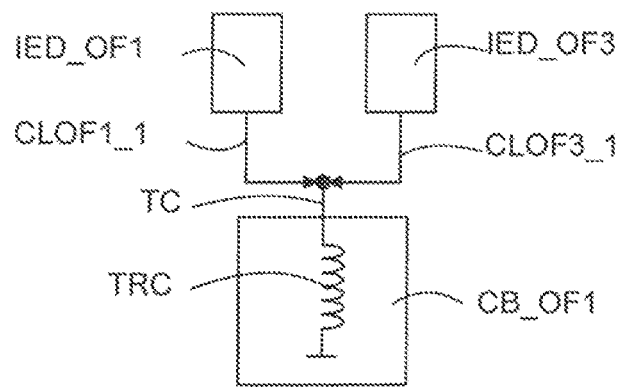
FIGS. 4 and 5 present schematically further alternative arrangements for controlling a state of a coupling device.
Figure 5:
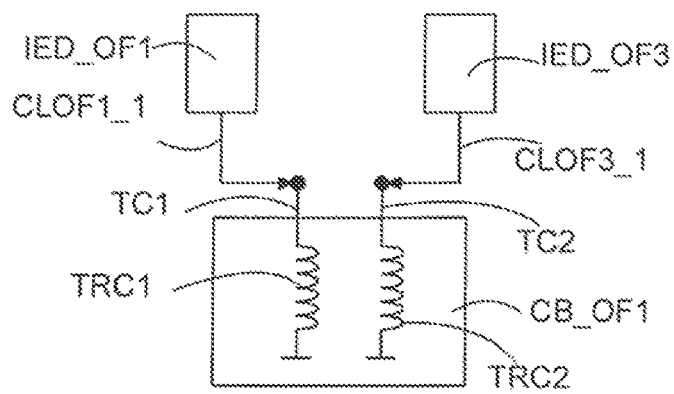

In FIGS. 4 and 5 it is presented two further alternative arrangements for controlling an operation of a single circuit breaker by two different intelligent electronic devices as generally presented in FIG. 2 and explained above. The arrangements are inspected in view of the first circuit breaker CB_OF1 in the first outgoing feeder OF1.

In the embodiment of FIG. 4 the first circuit breaker CB_OF1 comprises a single tripping circuit TC provided with a trip coil TRC which controls the position of the actual tripping contact (not shown in FIG. 4). Two intelligent electronic devices, i.e. the first intelligent electronic device IED_OF1 and the third intelligent electronic device IED_OF3 are connected to the same tripping circuit TC through the respective control lines CLOF1_1 and CLOF3_1. In a case wherein the first intelligent electronic device IED_OF1 is unable to control the state of the first circuit breaker CB_OF1, the control of the state of the first circuit breaker CB_OF1 may be provided through the third intelligent electronic device IED_OF3.

In the embodiment of FIG. 5 the first circuit breaker CB_OF1 comprises two parallel tripping circuits TC1 and TC2 each provided with an own trip coil TRC1 and TRC2 controlling the position of the actual tripping contact (not shown in FIG. 5). Two intelligent electronic devices, i.e. the first intelligent electronic device IED_OF1 and the third intelligent electronic device IED_OF3 are now connected to different tripping circuits TC1 and TC2 through the respective control lines CLOF1_1 and CLOF3_1. In a case wherein either the first intelligent electronic device IED_OF1 is unable to control the state of the first circuit breaker CB_OF1 or the first tripping circuit TC1 is defective, the control of the state of the first circuit breaker CB_OF1 may be provided through the third intelligent electronic device IED_OF3 and the second tripping circuit TC2. The operation situation wherein the tripping circuit is defective may be detected for example by a status information provided by a supervising circuit reserved for the tripping circuit.

In the embodiment of FIG. 5 the operating security of the first circuit breaker CB_OF1 could be further increased by connecting both of the control lines CLOF1_1 and CLOF3_1 to both tripping circuits TC1 and TC2.

The embodiments disclosed in FIGS. 4 and 5 may be applied with any of the circuit breakers disclosed above.

It will be obvious to a person skilled in the art that, as the technology advances, the inventive concept can be implemented in various ways. The invention and its embodiments are not limited to the examples described above but may vary within the scope of the claims.

The invention claimed is:

1. A system for feeder protection in an electrical power network nodal point comprising at least three feeders, the system comprising
at least one measurement instrument for each feeder for measuring at least one electrical quantity in its respective feeder,
at least one intelligent electronic device for each feeder for executing, on the basis of the at least one measured electrical quantity in its respective feeder, at least one first protection function that monitors a power system related condition of its respective feeder, and
at least one central intelligent electronic device configured to execute for at least one feeder, on the basis of the at least one measured electrical quantity in the at least one feeder, at least one second protection function that monitors the same power system related condition as the first protection function, wherein
the central intelligent electronic device is configured to further execute for the at least one feeder, on the basis of the at least one measured electrical quantity in the other feeders connected to the same nodal point, at least one third protection function that monitors the same power system related condition as the first and second protection function.

2. The system as claimed in claim 1, wherein the central intelligent electronic device is configured to execute the at least one third protection function for the at least one feeder based on at least current values in the other feeders connected to the same nodal point.

3. The system as claimed in claim 2, wherein the central intelligent electronic device is configured to determine, for the execution of the at least one third protection function, at least a subtraction of a sum of the current values in at least one outgoing feeder supplying power from the nodal point from a sum of the current values in at least one incoming feeder supplying power to the nodal point but leaving out from the subtraction the current value in the feeder for which the at least one third protection function is to be executed, wherein a value of the subtraction describes the current in the feeder for which the at least one third protection function is to be executed.

4. The system as claimed in claim 2, wherein the system comprises for each feeder at least one coupling device which in its closed state is configured to connect a power supply to/from its respective feeder, in its open state is configured to disconnect the power supply to/from its respective feeder, and is configured to be controlled by any of the at least one first, second and third protection functions.

5. The system as claimed in claim 4, wherein a control signal configured to operate the state of the coupling device in the at least one feeder is configured to be transmitted to the coupling device by at least one of the intelligent electronic device reserved for the at least one feeder and at least one intelligent electronic device reserved for another feeder.

6. The system as claimed in claim 4, wherein each coupling device comprises at least two parallel tripping circuits each of them being configured to change the state of the coupling device in response to the control signal provided by any of the at least one first, second and third protection functions.

7. The system as claimed in claim 5, wherein the coupling device comprises at least two parallel tripping circuits each of them being configured to change the state of the coupling device in response to the control signal provided by any of the at least one first, second and third protection functions.

8. The system as claimed in claim 6, wherein at least one of the tripping circuits is connected to the intelligent electronic device reserved for the respective feeder associated with the coupling device and at least one another tripping circuit is connected to another intelligent electronic device reserved for another feeder.

9. The system as claimed in claim 1, wherein the system comprises for each feeder at least one coupling device which in its closed state is configured to connect a power supply to/from its respective feeder, in its open state is configured to disconnect the power supply to/from its respective feeder, and is configured to have its state be controlled by any of the at least one first, second and third protection functions.

10. The system as claimed in claim 9, wherein a control signal configured to operate the state of the coupling device in the at least one feeder is configured to be transmitted to the coupling device by at least one of the intelligent electronic device reserved for the at least one feeder and at least one intelligent electronic device reserved for another feeder.

11. The system as claimed in claim 10, wherein the coupling device comprises at least two parallel tripping circuits each of them being configured to change the state of the coupling device in response to the control signal provided by any of the at least one first, second and third protection functions.

12. The system as claimed in claim 11, wherein at least one of the tripping circuits is connected to the intelligent electronic device reserved for the at least one feeder and at least one another tripping circuit is connected to another intelligent electronic device reserved for another feeder.

13. The system as claimed in claim 9, wherein each coupling device comprises at least two parallel tripping circuits each of them being configured to change the state of the coupling device in response to the control signal provided by any of the at least one first, second and third protection functions.

14. The system as claimed in claim 13, wherein at least one of the tripping circuits is connected to the intelligent electronic device reserved for the respective feeder associated with the coupling device and at least one another tripping circuit is connected another intelligent electronic device reserved for another feeder.

15. A method for feeder protection in an electrical power network nodal point comprising at least three feeders, the method comprising
   measuring in each respective feeder at least one electrical quantity,
   executing for each respective feeder, on the basis of the at least one measured electrical quantity in the respective feeder, at least one first protection function that monitors a power system related condition of the respective feeder,
   executing for at least one feeder, on the basis of the at least one measured electrical quantity in the at least one feeder, at least one second protection function that monitors the same power system related condition, and
   executing for the at least one feeder, on the basis of the at least measured electrical quantity in the other feeders connected to the same nodal point, at least one third protection function that monitors the same power system related condition.

16. The method as claimed in claim 15, further comprising executing the at least one third protection function for the at least one feeder based on at least current values in the other feeders connected to the same nodal point.

17. The method as claimed in claim 16, further comprising determining for the execution of the at least one third protection function at least a subtraction of a sum of the current values in at least one outgoing feeder supplying power from the nodal point from a sum of the current values in at least one incoming feeder supplying power to the nodal point but leaving out from the subtraction the current value in the feeder for which the at least one third protection function is to be executed, wherein a value of the subtraction describes the current in the feeder for which the at least one third protection function is to be executed.

18. The method as claimed in claim 15, wherein the system comprises for each feeder at least one coupling device which in its closed state is configured to connect a power supply to/from its respective feeder, in its open state is configured to disconnect the power supply to/from its respective feeder, and have its state controlled by any of the at least one first, second and third protection functions.

19. The method as claimed in claim 18, further comprising transmitting a control signal to operate the state of the coupling device in the at least one feeder by at least one of an intelligent electronic device reserved for the at least one feeder and at least one intelligent electronic device reserved for another feeder.

20. The method as claimed in claim 19, wherein the coupling device comprises at least two parallel tripping circuits each of them being configured to change the state of the coupling device in response to the control signal provided by any of the at least one first, second and third protection functions, at least one of the tripping circuits is connected to the intelligent electronic device reserved for the at least one feeder and at least one another tripping circuit is connected to another intelligent electronic device reserved for another feeder.

* * * * *